United States Patent

[11] 3,539,231

| [72] | Inventor | Hakon Olof Scheibe Langstrom<br>Goteborg, Sweden |
|---|---|---|
| [21] | Appl. No. | 770,980 |
| [22] | Filed | Oct. 28, 1968 |
| [45] | Patented | Nov. 10, 1970 |
| [73] | Assignee | Aktiebolaget Svenska Kullagerfabriken<br>Goteborg, Sweden<br>a corporation of Sweden |
| [32] | Priority | Oct. 27, 1967 |
| [33] |  | Sweden |
| [31] |  | 14,706/67 |

[54] CAGE FOR ROLLING BEARINGS
1 Claim, 4 Drawing Figs.

| [52] | U.S. Cl. | 308/187,<br>308/201 |
|---|---|---|
| [51] | Int. Cl. | F16c 1/24,<br>F16c 33/38 |
| [50] | Field of Search | 308/201,<br>187 |

[56] References Cited
UNITED STATES PATENTS

| 1,742,418 | 1/1930 | Schubert | 308/201 |
|---|---|---|---|
| 1,857,823 | 5/1932 | Robinson | 308/201 |
| 2,590,939 | 4/1952 | Cobb | 300/201 |

FOREIGN PATENTS

| 676,648 | 11/1929 | France | 308/201 |
|---|---|---|---|
| 965,714 | 6/1957 | Germany | 308/201 |

Primary Examiner—Fred C. Mattern, Jr.
Assistant Examiner—Frank Susko
Attorney—Howson and Howson

ABSTRACT: A rolling bearing assembly having a cage with circumferentially arranged pockets having rolling elements therein. Radial and axial passageways are provided in the pockets of the cage for the passage of lubricant. Each of the pockets are arranged to have a greater clearance at diametrically opposed areas to obtain a predetermined thickness of lubricant between the rolling element and the cage.

Patented Nov. 10, 1970
3,539,231
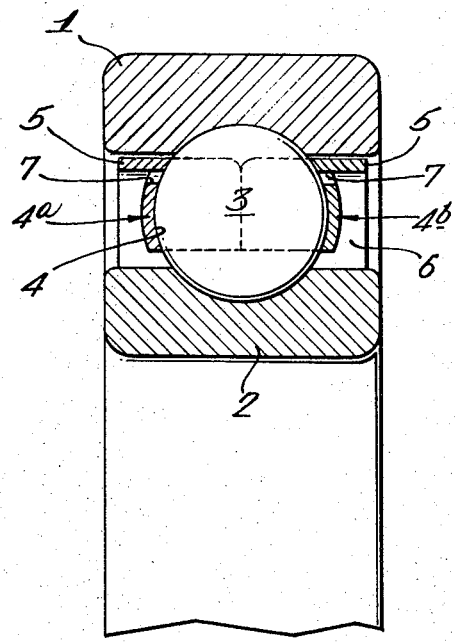
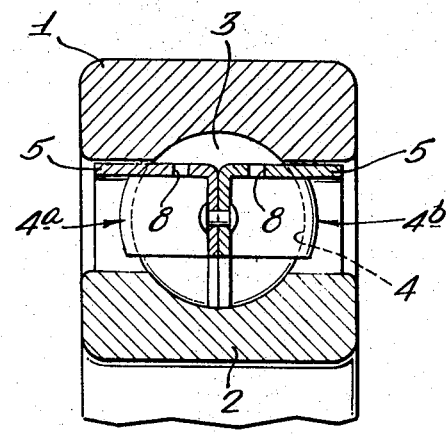
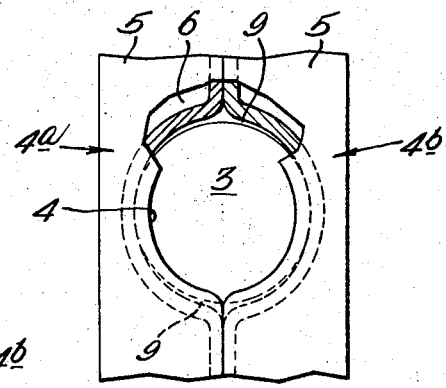
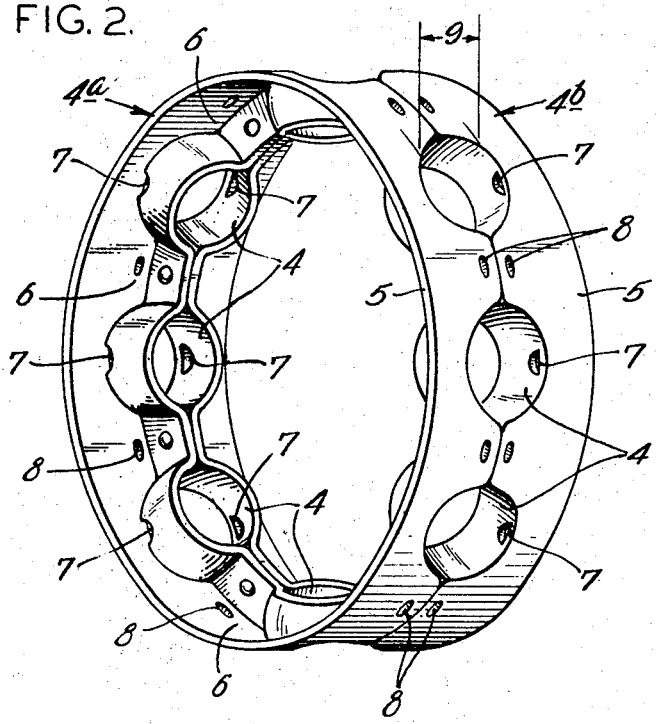
INVENTOR:
HAKON OLOF SCHEIBE LÅNGSTRÖM
BY Howson & Howson
ATTYS.

CAGE FOR ROLLING BEARINGS

The present invention relates to a cage for rolling bearings which in addition to its function of retaining the rolling bodies of the bearing also serves to provide a more effective lubrication of the various members of the bearing than it has hitherto been possible to attain.

The invention is described in the following as applied to a single-row deep-grooved ball bearing, but it is to be understood that its use is in no way limited to this type of bearing. The invention is characterized mainly thereby that the bearing cage is provided with a number of pockets for retaining the rolling bodies formed in a pair of similar annular cage portions and that in conjunction with these cage portions a collar or similar member is provided, the width of which is wider than the width of the race of the outer race ring of the bearing around the whole periphery of the cage.

The invention is more fully described in the following with reference to the accompanying drawing in which:

FIG. 1 shows a deep-groove ball bearing having a cage according to the invention;

FIG. 2 is a view in perspective of the cage shown in FIG. 1;

FIG. 3 is a transverse sectional view similar to FIG. 1 taken through the bearing at a point between adjacent pockets in the cage; and FIG. 4 is a fragmentary plan view of a portion of the cage and ball assembly with parts broken away to show details of the cage and ball relationship.

The bearing comprises an outer race ring 1 and an inner race ring 2 and a set of balls located therebetween. The cage has a number of pockets 4 formed in two similar annular cage portions 4a and 4b and has a collar portion 5 arranged in conjunction with each of the said cage portions. The width of the collar portion around the whole periphery of the cage is greater than that of the race of the outer race ring. Both of the cage members comprising pocket-forming portions and collar portions can be held together upon assembly between the race rings by riveting, welding, or in any other suitable manner. Spaces 6 will thereby be formed for receiving lubricant. These spaces may suitably communicate with the ball pockets through passages or holes 7 through the walls of the pockets. FIG. 2 shows clearly how the collar portion 5 is disposed relative to the pocket-forming portions 4a and 4b of the cage and the lubricant passages 7.

In order to make the lubrication of the bearing still more effective the cage may be provided with other lubricant passages 8. The diameter of the collar portion 5 may suitably be such relative to the inner diameter of the outer race ring that the cage will be centered in the outer race ring.

A great advantage in a bearing having a cage according to the invention is that it can be lubricated, possibly for life, before being mounted so that further lubrication will hardly be necessary. As mentioned in the introduction the use of the invention is not limited to bearings of the type illustrated but it may be applied to other types of bearings in which the shape and location of the rolling bodies permits thereof. When the cage is used in deep-grooved bearing it may be preferable to form the portions of the pockets surrounding the balls at the locations indicated by the numeral 9 in FIG. 2 with a greater clearance than at the other portions of the pockets surrounding the balls in order to obtain a certain thickness of the lubricant film acting at said locations, so that the play between the ball and the wall of the pocket at this portion will be greater than at other parts in order to ensure a certain thickness of the lubricant film which will be created at this spot. The inner walls of the pockets may also be made cylindrical in order to permit radial movement of the balls in their pockets.

When the bearing is running the lubricant, which has been introduced into the spaces around the pocket members, will be thrown by centrifugal force towards the collar portion, and oil from the lubricant (grease) will make its way in to the contacting surfaces of the bearing. The cage may be made of any suitable material such as metal, plastic, or the like. It is also possible to make it with any material suitable for the pocket-forming portions and any other suitable material for the collar portion.

I claim:

1. A rolling bearing assembly comprising inner and outer spaced-apart ring members having confronting circumferentially extending raceways, a plurality of rolling elements in the annular space between the ring members, a cage for circumferentially spacing the rolling elements, said cage having a circumferentially extending axially directed collar portion wider than the raceways and disposed closely adjacent one of the raceways and having at least one radial passage for circulation of lubricant between adjacent pockets, each pocket being formed by at least one wall portion projecting from said collar and having at least one axial passage at the juncture of the wall portion and collar, the inner surface of said wall portion conforming generally in contour to the rolling element and being of configuration to provide a greater clearance at diametrically opposed areas to obtain a predetermined thickness of lubricant film at these areas.